United States Patent
Pattan et al.

(10) Patent No.: US 11,327,820 B2
(45) Date of Patent: *May 10, 2022

(54) METHOD AND APPARATUS FOR PROVIDING NETWORK-BASED NORTHBOUND APPLICATION PROGRAMMING INTERFACE IN A WIRELESS COMMUNICATION SYSTEM

(71) Applicant: SAMSUNG ELECTRONICS CO., LTD., Suwon-si (KR)

(72) Inventors: Basavaraj Jayawant Pattan, Bangalore (IN); Suresh Chitturi, Bangalore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/195,041

(22) Filed: Mar. 8, 2021

(65) Prior Publication Data

US 2021/0279119 A1    Sep. 9, 2021

Related U.S. Application Data

(63) Continuation of application No. 16/610,142, filed as application No. PCT/KR2018/005099 on May 2, 2018, now Pat. No. 10,942,794.

(30) Foreign Application Priority Data

May 2, 2017 (IN) .............................. 201741015554
Apr. 27, 2018 (IN) .............................. 201741015554

(51) Int. Cl.
*G06F 9/54* (2006.01)
*H04W 80/12* (2009.01)

(52) U.S. Cl.
CPC ............. *G06F 9/547* (2013.01); *H04W 80/12* (2013.01)

(58) Field of Classification Search
CPC ...................................................... G06F 9/541
(Continued)

(56) References Cited

U.S. PATENT DOCUMENTS 9,491,063 B2 * 11/2016 Kempf .................. G06F 9/5072
9,668,236 B2    5/2017 Ryu et al.
(Continued)

FOREIGN PATENT DOCUMENTS

WO    2017070383 A1    4/2017

OTHER PUBLICATIONS

Communication dated Oct. 8, 2020 by the Indian Patent Office in counterpart Application No. 201741015554.
(Continued)

*Primary Examiner* — Andy Ho
(74) *Attorney, Agent, or Firm* — Sughrue Mion, PLLC

(57) ABSTRACT

A pre-5th-Generation (5G) or 5G communication system to be provided for supporting higher data rates Beyond 4th-Generation (4G) communication system such as Long Term Evolution (LTE). Embodiments herein achieve a method and system for providing a network-based northbound application programming interface. The method includes receiving, by an API provider, a request for invoking one or more service APIs from one or more API invoker clients. The method includes utilizing, by the API provider, a CAPIF core function residing at a first domain to provide the one or more service APIs. The method includes providing, by the API provider, the one or more service APIs to the one or more API invoker clients through the CAPIF core function, wherein the API provider comprises one or more service APIs, an API exposing function, an API publishing function and an API management function.

20 Claims, 10 Drawing Sheets

(58) Field of Classification Search
USPC .......................................................... 719/328
See application file for complete search history.

(56) References Cited

U.S. PATENT DOCUMENTS

| | | | |
|---|---|---|---|
| 10,148,826 B2* | 12/2018 | Malee | ..................... H04W 4/12 |
| 10,200,258 B2* | 2/2019 | Mattson | .............. H04L 41/5051 |
| 2015/0350102 A1 | 12/2015 | Leon-Garcia et al. | |
| 2017/0019750 A1 | 1/2017 | Palanisamy et al. | |
| 2018/0288590 A1 | 10/2018 | Bhalla | |
| 2019/0124671 A1 | 4/2019 | Starsinic et al. | |
| 2020/0022008 A1 | 1/2020 | Magee et al. | |

OTHER PUBLICATIONS

Written Opinion (PCT/ISA/237) issued by the International Searching Authority in corresponding International Application No. PCT/KR2018/005099, dated Aug. 7, 2018.
ETSI TR 118 524 "oneM2M 3GPP Release 13 Interworking (oneM2M TR-0024 version 2.0.0)" V2.0.0, Sep. 26, 2016, (50 pages total).
3rd Generation Partnership Project"Technical Specification Group Services and System Aspects Study on Common API Framework for 3GPP Northbound APIs (Release 15)" 3GPP TR 23.722, V0.1.1, Apr. 11, 2017, (20 pages total).
International Search Report (PCT/ISA/210), issued by International Searching Authority in corresponding International Application No. PCT/KR2018/005099, dated Aug. 7, 2018.

* cited by examiner

[Fig. 1]
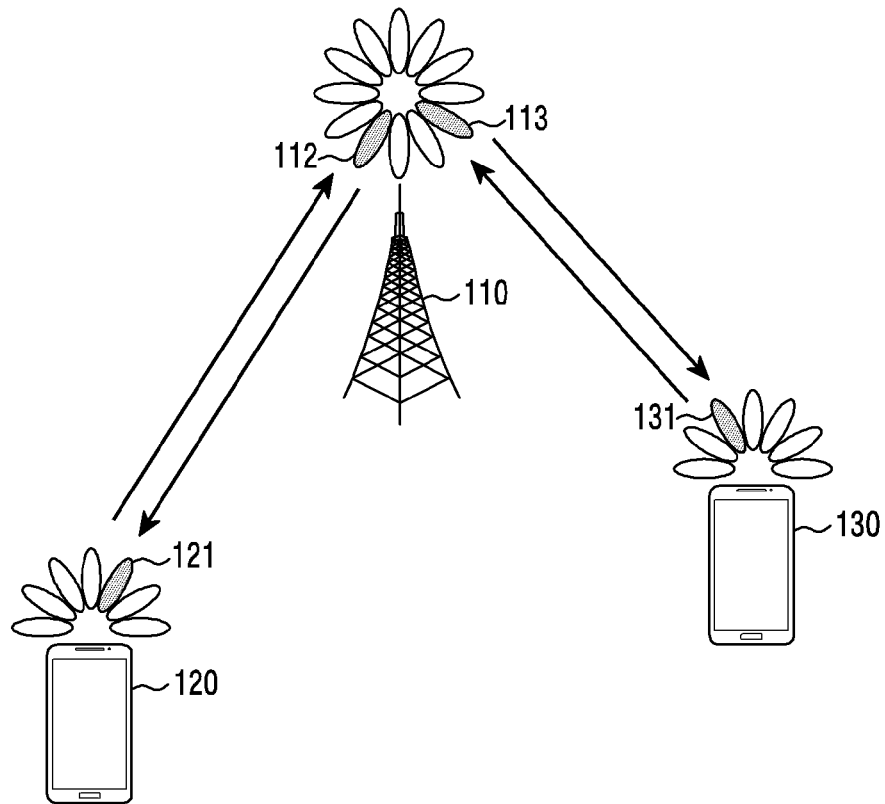
[Fig. 2]
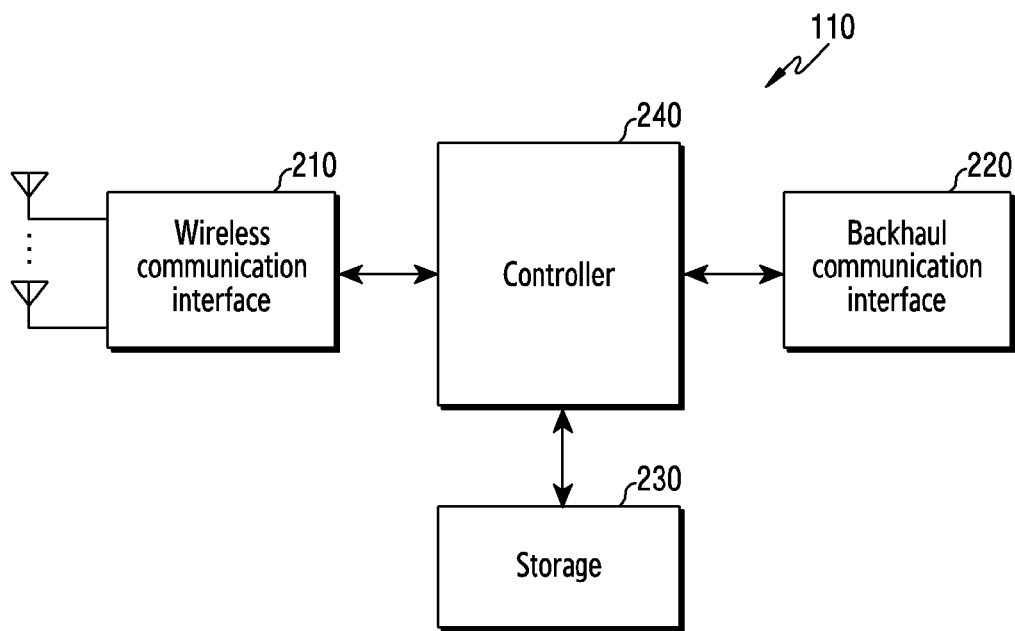

[Fig. 3]
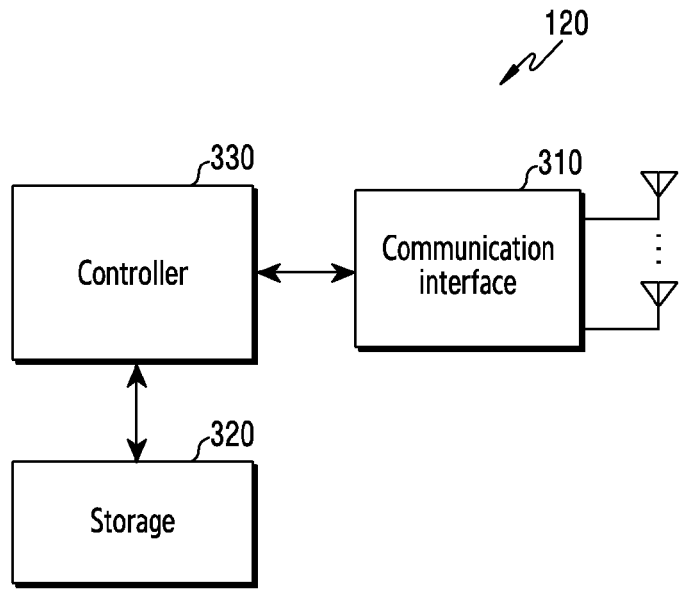
[Fig. 4]
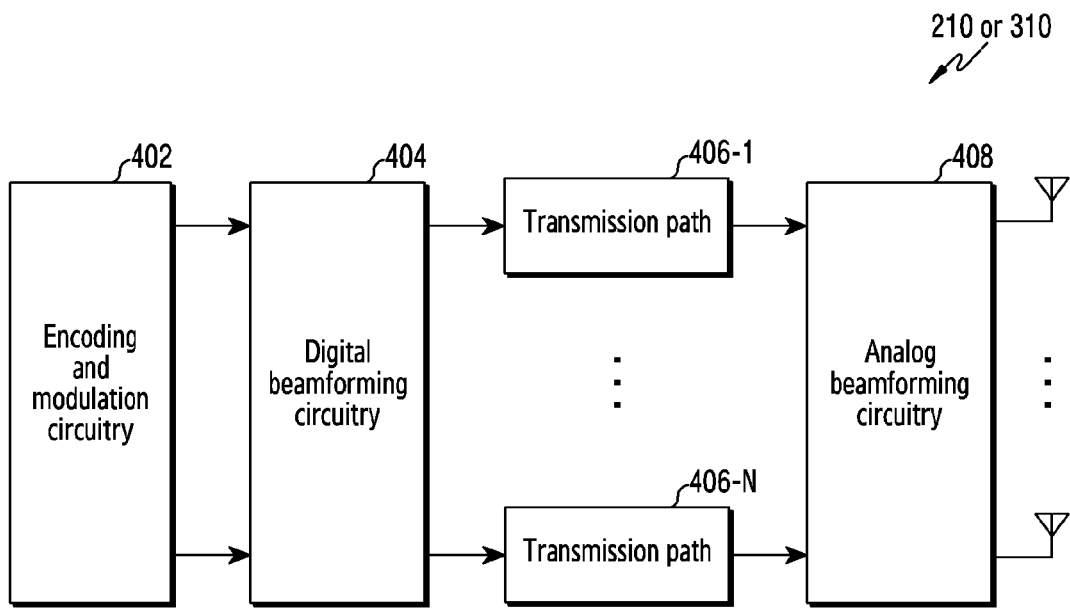

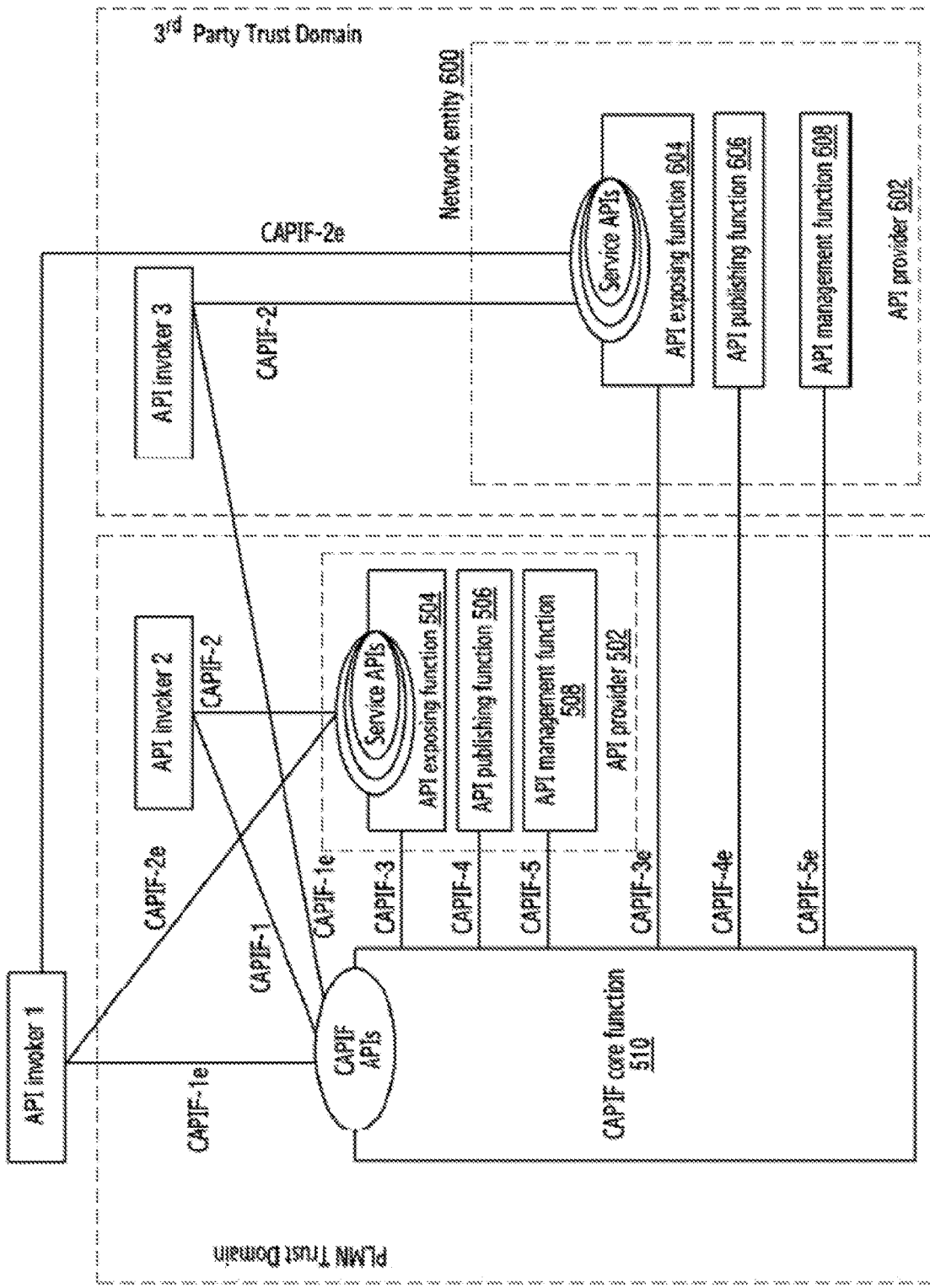

[Fig. 6]
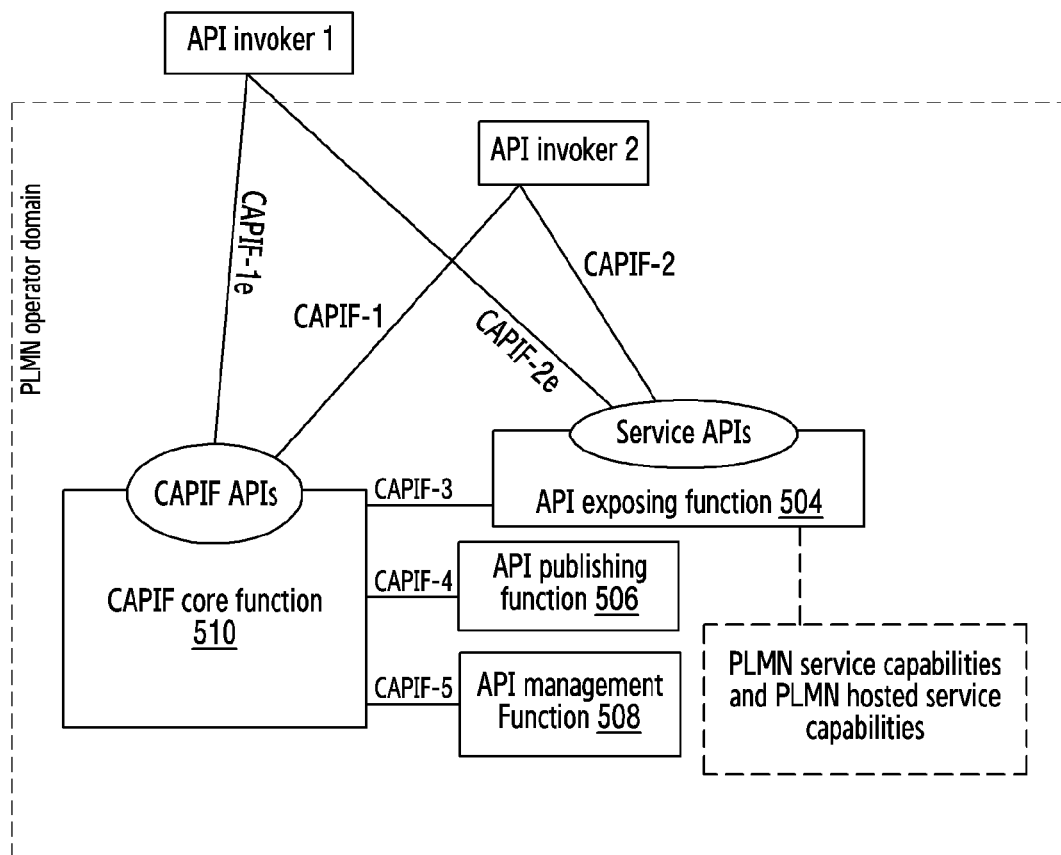

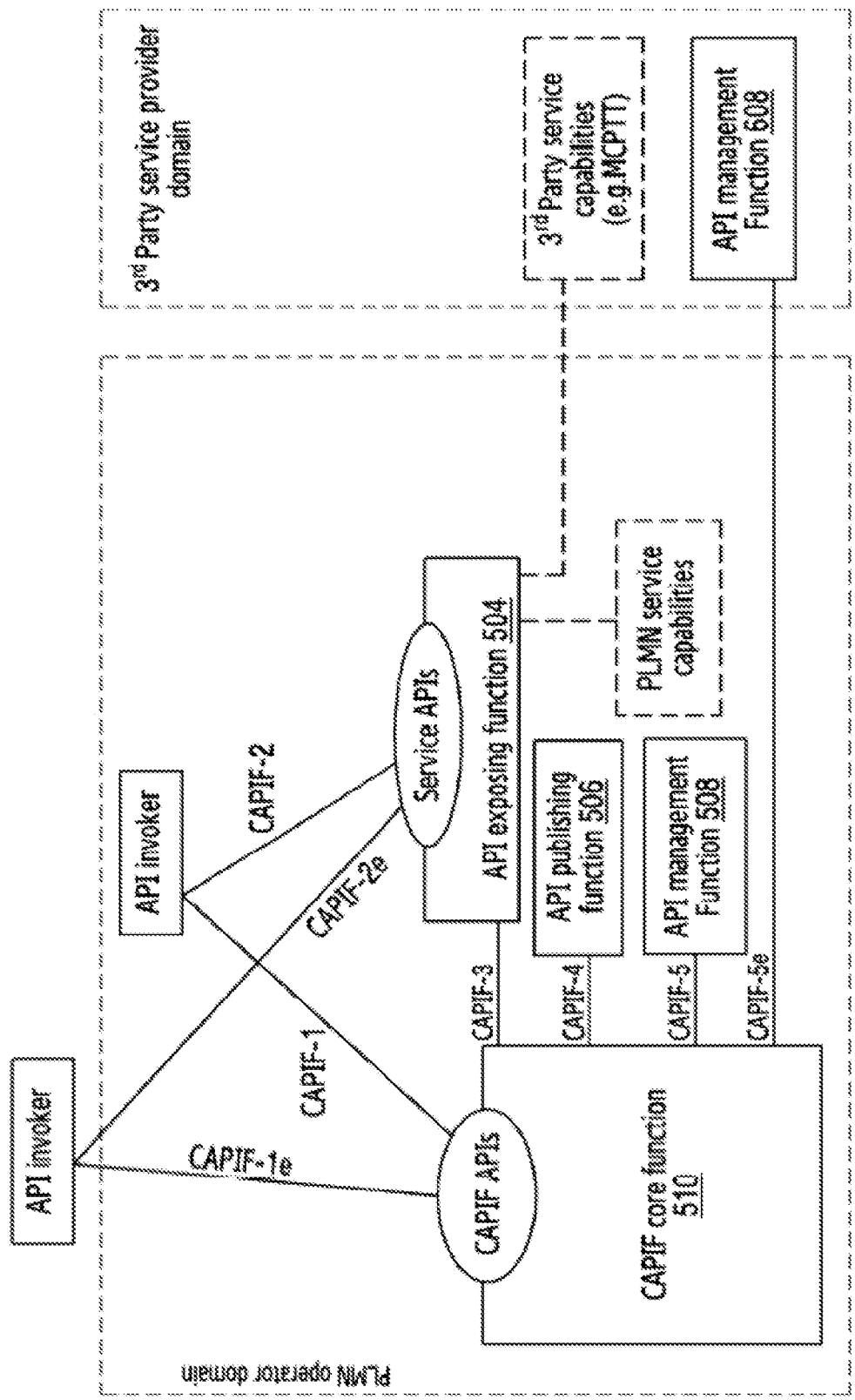
[Fig. 7]

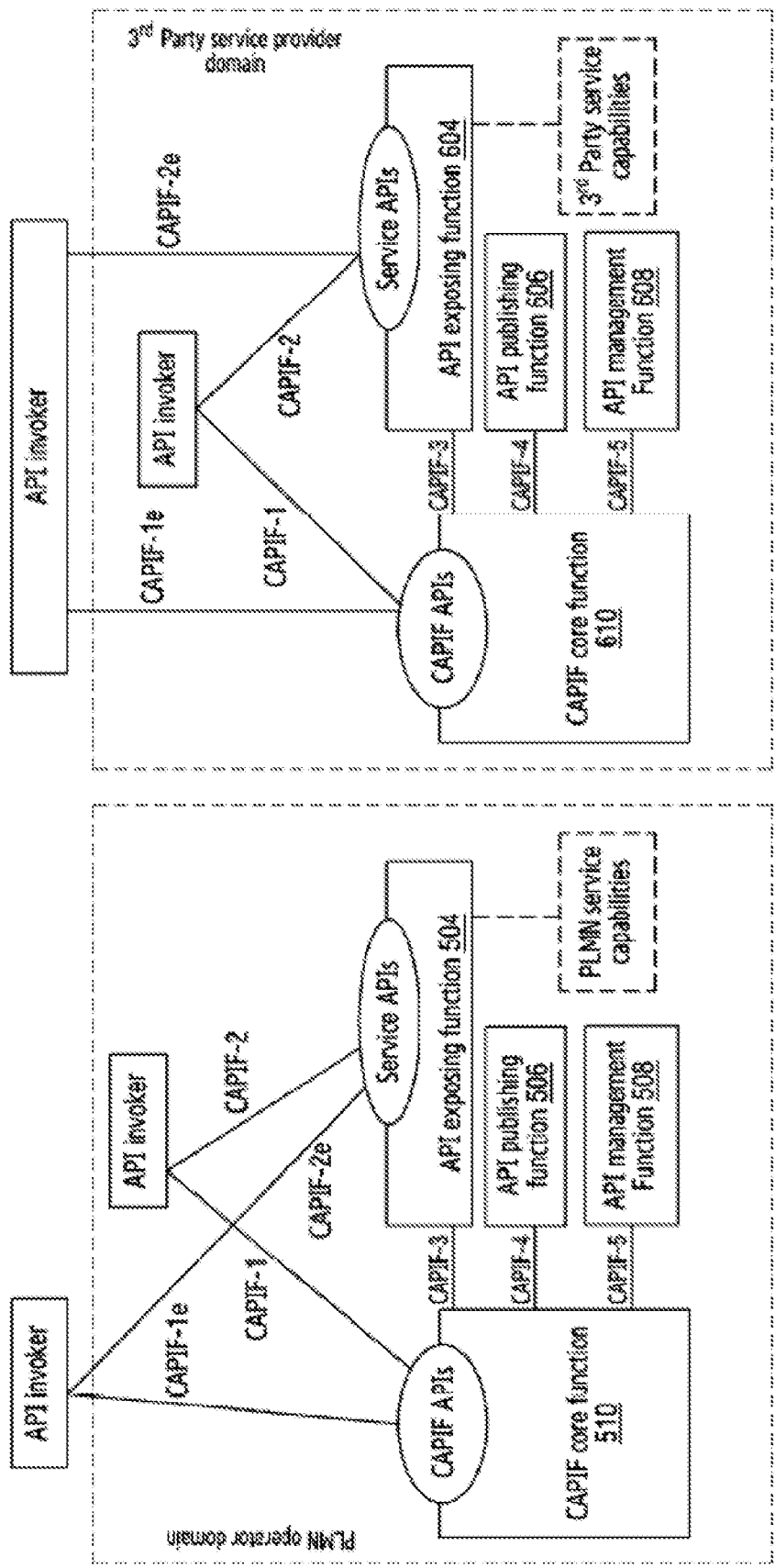
[Fig. 8]

[Fig. 9]
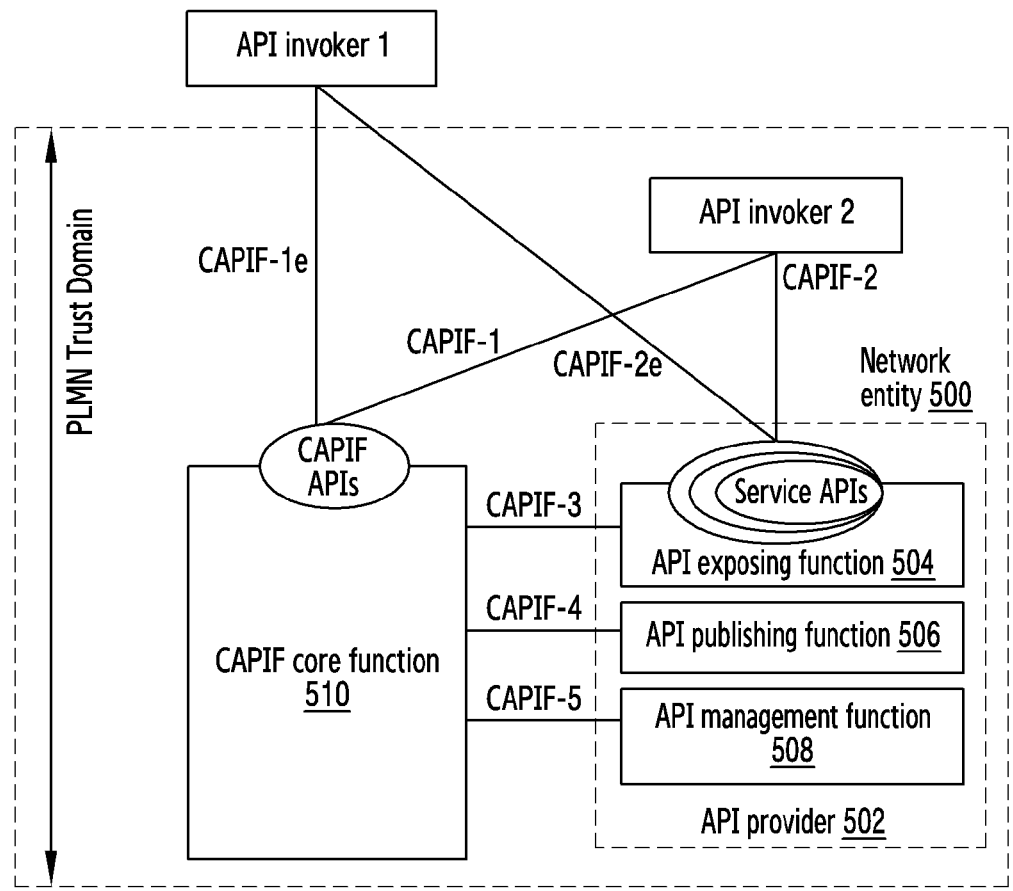

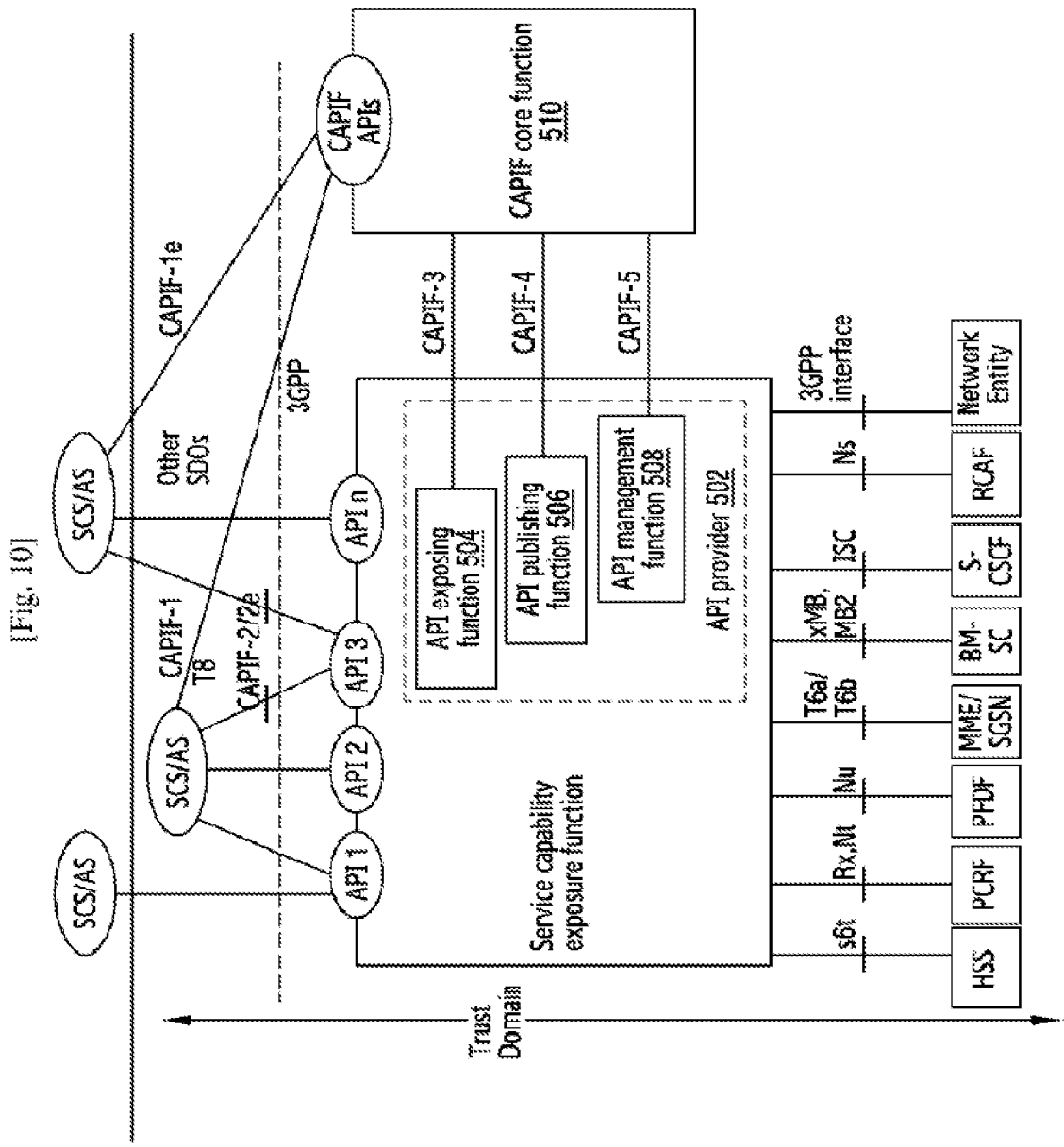
[Fig. 10]

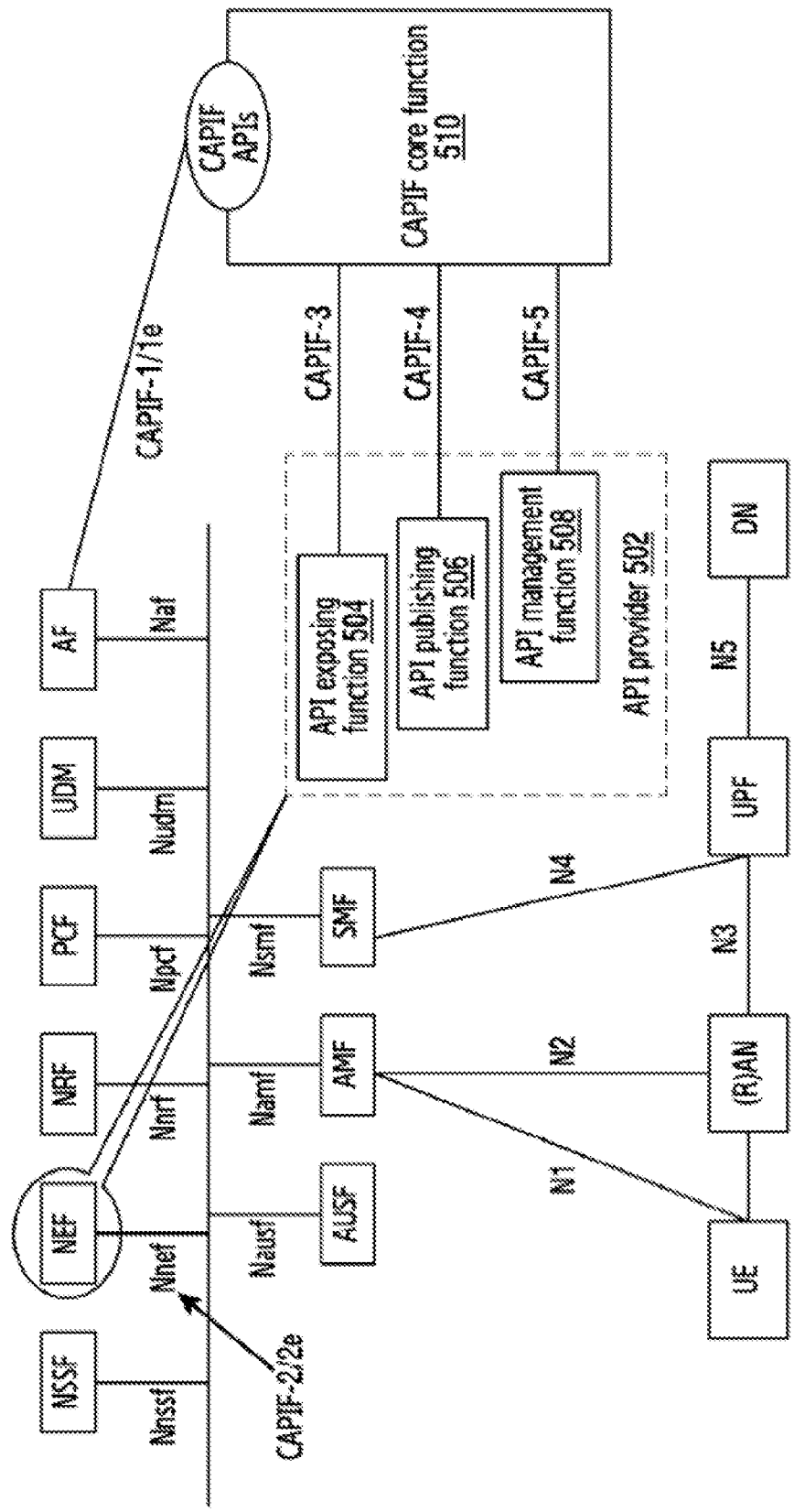
[Fig. 11]

[Fig. 12]
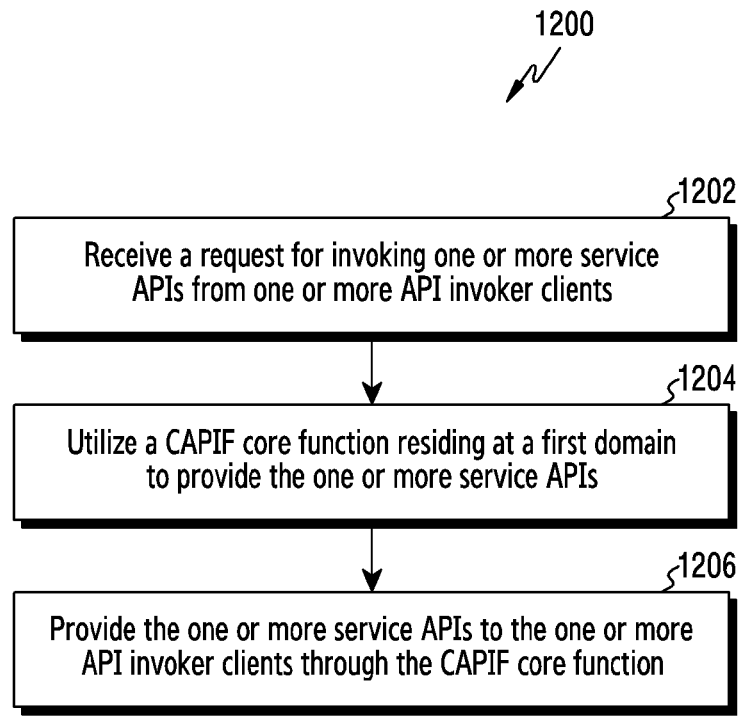
[Fig. 13]
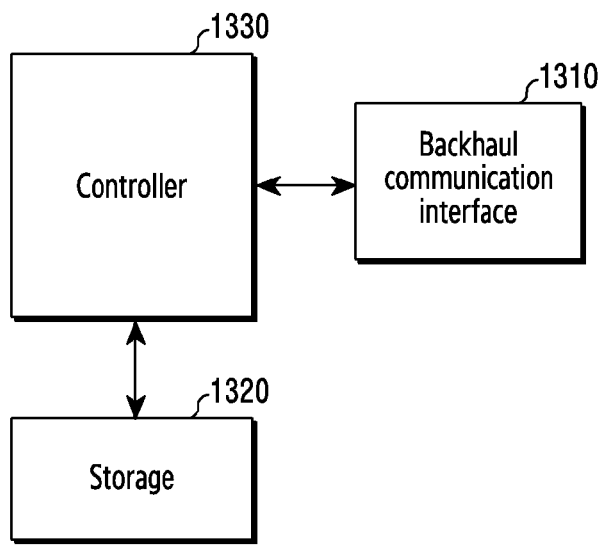

METHOD AND APPARATUS FOR PROVIDING NETWORK-BASED NORTHBOUND APPLICATION PROGRAMMING INTERFACE IN A WIRELESS COMMUNICATION SYSTEM

CROSS-REFERENCE TO RELATED APPLICATIONS

This application is a Continuation of U.S. application Ser. No. 16/610,142 filed on Nov. 1, 2019, in the U.S. Patent and Trademark Office, which is a National Stage Application of International Application No. PCT/KR2018/005099, filed on May 2, 2018, which is based on and claims priority under 35 U.S.C. § 119 from an Indian Patent Application Number 201741015554 filed on May 2, 2017, and Indian Patent Application Number 201741015554 filed on Apr. 27, 2018, the disclosures of which are incorporated by reference in their entireties.

1. FIELD

The embodiments herein relate to a wireless communication system. More particularly it is related to a method and apparatus for providing a network-based northbound application programming interface in a wireless communication system.

2. BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

In the third generation partnership project (3GPP), $3^{rd}$ party service Application Programming Interfaces (APIs) (also referred to as northbound APIs) are available for certain 3GPP defined functions. These include Service Capability Exposure Function (SCEF) which is a generic exposure functional entity that allows network providers to expose underlying 3GPP network functionality. Another instance of such service API is the "xMB", which enables content providers to ingest content into the 3GPP networks which can be subsequently broadcasted to users in the mobile networks (e.g. via MBMS). These APIs are developed independently and with no coordination with each other. To address the growing needs of various vertical industries and in order to better integrate with wireless networks such as 3GPP networks, a common API framework is essential.

SUMMARY

The principal object of the embodiments herein is to provide a method and system for providing a network-based northbound application programming interface.

Another object of the embodiments herein is to provide a method for utilizing, a CAPIF core function residing at a first domain to provide the one or more service APIs. The first domain is a Public Land Mobile Network (PLMN) domain.

Another object of the embodiments herein is to provide a CAPIF core function at a second domain. The second domain is a third party trust domain.

Another object of the embodiments herein is to provide the one or more service APIs to the one or more API invoker clients through the CAPIF core function, wherein an API provider residing at the second domain includes one or more service APIs, an API exposing function, an API publishing function and an API management function.

Another object of the embodiments herein is receive a request for invoking one or more service APIs through one of a common API framework 2 (CAPIF-2) interface and a CAPIF-2e interface.

Another object of the embodiments herein is to provide an API provider residing at the first domain. The API provider residing at the first domain comprises the one or more service APIs, an API exposing function, an API publishing function and an API management function.

Accordingly the embodiment herein provide a method for providing a network-based northbound application programming interfaces (APIs) in a wireless communication system. The method includes receiving, by an API provider, a request for invoking one or more service APIs from one or more API invoker clients. The method includes utilizing, by the API provider, a CAPIF core function residing at a first domain to provide the one or more service APIs. The method includes providing, by the API provider, the one or more service APIs to the one or more API invoker clients through the CAPIF core function, wherein the API provider comprises one or more service APIs, an API exposing function, an API publishing function and an API management function.

In an embodiment, the API provider resides at a second domain, wherein the CAPIF core function provides CAPIF core functions to the one or more service APIs in the second domain.

In an embodiment, the first domain is a Public Land Mobile Network (PLMN) domain and the second domain is a third party domain.

In an embodiment, the request for invoking one or more service APIs is received through one of a common API framework 2 (CAPIF-2) interface and a CAPIF-2e interface.

In an embodiment, the API publishing function associated with the second domain publishes the one or more service APIs to the common API framework (CAPIF) core function at the first domain through a CAPIF-4e message.

In an embodiment, the API provider performs at least one of authentication and authorization of the one or more API invoker clients using the CAPIF-2 interface and the CAPIF-2e interface from the one or more API invoker clients.

In an embodiment, the API provider communicates with the CAPIF core function for performing at least one of access control of the service APIs, data logging, charging, authentication and authorization through a CAPIF-3e interface.

In an embodiment, the API management function communicates with the CAPIF core function at the second domain to perform at least one of access monitoring and checking policy configurations and provisioning of an API invoker client through a CAPIF-5e interface.

In an embodiment, the one or more service APIs are discoverable at the CAPIF core function associated with the first domain through one of a CAPIF-1 interface and a CAPIF-1e interface to the one or more API invoker clients.

In an embodiment, the CAPIF core function resides at a second domain, wherein the CAPIF core function hosts the one or more service capabilities of the API provider associated with the second domain.

In an embodiment, the API provider resides at the first domain, wherein the API provider residing at the first domain comprises the one or more service APIs, an API exposing function, an API publishing function and an API management function, wherein the network entity resides at a network operator.

In an embodiment, the API provider receives a request for invoking one or more service APIs from one or more API invoker clients.

In an embodiment, the request for invoking one or more service APIs is received through one of common API framework 2 (CAPIF-2) interface and CAPIF-2e interface.

In an embodiment, the API publishing function publishes the one or more service APIs to the common API framework (CAPIF) core function.

In an embodiment, the API provider performs at least one of authentication and authorization of the one or more API invoker clients using the request received through the CAPIF-2 and CAPIF-2e interface from the one or more API invoker clients.

In an embodiment, the API publishing function publishes the one or more service APIs to the CAPIF core function through a CAPIF-4 interface.

In an embodiment, the one or more service APIs are discoverable at the CAPIF core function through one of a CAPIF-1 message and a CAPIF-1e message received from the one or more API invoker clients.

In an embodiment, the CAPIF core function performs at least one of authentication and authorization of the one or more API invoker clients using the CAPIF-1 message and CAPIF-1e message.

In an embodiment, the CAPIF core function communicates with the API provider for performing at least one of access control of the service APIs, data logging, charging, authentication and authorization through a CAPIF-3 message.

In an embodiment, the API management function communicates with the CAPIF core function to perform at least one of access monitoring of the one or more service APIs and checking policy configurations and provisioning of an API invoker client through a CAPIF-5 message.

Accordingly the embodiments herein provide a network entity for providing network based north bound application programming interfaces (APIs) in a wireless communication system. The network entity comprises an API provider configured to receive a request for invoking one or more service APIs from one or more API invoker clients. The API provider is configured to utilize a CAPIF core function residing at a first domain to support the one or more service APIs. The API provider is configured to provide the one or more service APIs to the one or more API invoker clients through the CAPIF core function. The API provider comprises one or more service APIs, an API exposing function, an API publishing function and an API management function.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

The disclosure can provide a method for utilizing, a CAPIF core function residing at a first domain to provide the one or more service APIs. The first domain is a Public Land Mobile Network (PLMN) domain.

The disclosure can provide a CAPIF core function at a second domain. The second domain is a third party trust domain.

The disclosure can provide the one or more service APIs to the one or more API invoker clients through the CAPIF core function, wherein an API provider residing at the second domain includes one or more service APIs, an API exposing function, an API publishing function and an API management function.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 illustrates a common API framework (CAPIF) architecture to support 3rd party API providers apart from API provider in the same domain where CAPIF core function exists, according to an embodiment as disclosed herein;

FIG. 6 illustrates various interactions when CAPIF is hosted in PLMN domain supporting service capabilities in the PLMN domain, according to an embodiment as disclosed herein;

FIG. 7 illustrates various interactions when CAPIF is hosted in PLMN domain and API management in third party domain, according to an embodiment as disclosed herein;

FIG. 8 illustrates various interactions when CAPIF is hosted in both PLMN domain and third party domain, according to an embodiment as disclosed herein;

FIG. 9 illustrates a common API framework (CAPIF) architecture hosted in PLMN domain when there is no 3rd party domain, according to an embodiment as disclosed herein;

FIG. 10 illustrates an integration of CAPIF with a Long Term Evolution (LTE) System, according to an embodiment as disclosed herein;

FIG. 11 illustrates an integration of CAPIF with a New Radio (NR) System, according to an embodiment as disclosed herein; and FIG. 12 is a flow chart illustrating a method for providing network based north bound APIs in a wireless communication system, according to an embodiment as disclosed herein.

FIG. 13 illustrates a network entity in the wireless communication system according to various embodiments of the present disclosure.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for a method and system for providing a network-based northbound application programming interface in a wireless communication system.

The terms referring to a method and system for providing a network-based northbound application programming interface, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Prior to describing the embodiments in detail, the following definitions of the entities involved in providing a network-based northbound application programming interfaces (APIs) are described herein.

API: The means by which an API invoker can access the service.

API invoker: The entity which invokes the common API Framework (CAPIF) or service APIs.

API invoker profile: The set of information associated to an API invoker that allows that API invoker to utilize CAPIF APIs and service APIs.

API exposing function: The entity which provides the service communication entry point for the service APIs.

CAPIF administrator: An authorized user with special permissions for CAPIF operations.

Common API framework: A framework comprising common API aspects that are required to support service APIs.

Northbound API: A service API exposed to higher-layer API invokers.

Onboarding: One time registration process that enables the API invoker to subsequently access the CAPIF and the service APIs.

Resource: The object or component of the API on which the operations are acted upon.

Service API: The interface through which a component of the system exposes its services to API invokers by abstracting the services from the underlying mechanisms.

PLMN trust domain: The entities protected by adequate security and controlled by the PLMN operator or a trusted 3rd party of the PLMN.

3rd party trust domain: The entities protected by adequate security and controlled by the 3rd party.

The embodiments herein provide a method and system for providing a network-based northbound application programming interface. The method includes receiving, by an API provider, a request for invoking one or more service APIs from one or more API invoker clients. The method includes utilizing, by the API provider, a CAPIF core function residing at a first domain to provide the one or more service APIs. The method includes providing, by the API provider, the one or more service APIs to the one or more API invoker clients through the CAPIF core function, wherein the API provider comprises one or more service APIs, an API exposing function, an API publishing function and an API management function.

In an embodiment, the CAPIF core function enables the applications to access the service APIs through common functions such as application registration, service API discovery, authentication, authorization, and the API provider to manage and access API information The CAPIF core function stores various data related to Service APIs e.g. access control list, authentication credentials, API log events for the configured duration, configured policies, Application profile information, lifecycle management reports, monitoring events, charging information, Application authentication status, API registry.

The proposed method and system can be used to provide the network-based northbound API. The various embodiments of the disclosure describes broadly three distinct functional models in which the common API framework can be hosted or realized, as described below:

Network provider hosted CAPIF: In some embodiments, various entities of the CAPF are hosted or controlled by the network provider, while the application may or may not reside within the network provider domain.

3rd party service provider hosted CAPIF: In some embodiments, all the entities of the CAPIF are hosted in the 3rd party service provider domain which is different from the network provider domain. However, the network capabilities are hosted by the network provider and therefore reside in the network provider domain. The application in this case resides either in the 3rd party service provider domain or outside the network provider domain foreign to the 3rd party service provider domain.

Network provider-assisted CAPIF for 3rd party service provider: In various embodiments, a hybrid approach is proposed, wherein the CAPIF is hosted in the network provider domain similar to the network provider hosted framework model, with the ability for 3rd party service providers to integrate their service capabilities with the framework in the network provider domain. This is useful in cases such as mission critical services where an application server is hosted in the 3rd party service provider domain while the application server utilizes the network capabilities hosted by the network provider. In such cases, the API management function needs to be shared by the network provider (PLMN operator) and the 3rd party service provider.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

The common API framework consists of common functions or capabilities (such as registration, discovery, authorization, authentication, registration, etc.) which paves the way for a consistent approach to accessing such common capabilities for one or more service APIs, by the 3rd party applications or application servers.

To address this need, 3GPP initiated a new study on Common API framework for 3GPP northbound APIs (FS_CAPIF). The technical report of CAPIF (TR 23.722 v0.1.1) has captured an initial solution of the high level architecture. A reference point A1 represents the API that exposes the framework functions while the A2 reference point exposes the service APIs for invoking the service functionality, and A3 represents the interactions between the framework functions and the service APIs. The API consumer i.e., the 3rd party application (or the application server) can reside in the network provider (PLMN) domain or outside the PLMN trust domain.

Although the high-level architecture has been defined, the aspects pertaining to what constitutes "framework control functions" and "common API framework functions", and how the interactions between them are realized is not specified or discussed in the current technical report.

Further, the sequence of operations e.g. how the application or API consumer of the framework interacts with the functions of the framework, and subsequent interactions between the framework functions lacks clarity. In addition, the applicability of the framework to functions beyond SCEF (e.g. NEF) needs to be considered, and as well as functions (e.g. MCPTT server) that reside outside the operator domain. Further, how the API service provider or the management entity associated with the service provider is able to configure the framework to support these models needs to be addressed.

The above information is presented as background information only to help the reader to understand the present invention. Applicants have made no determination and make no assertion as to whether any of the above might be applicable as Prior Art with regard to the present application.

Referring now to the drawings, and more particularly to FIGS. 5 through 12, where similar reference characters denote corresponding features consistently throughout the figures, there are shown preferred embodiments.

FIG. 5 illustrates a common API framework (CAPIF) architecture to support 3rd party API providers apart from API provider in the same domain where CAPIF core function exists, according to an embodiment as disclosed herein.

As depicted in the FIG. 5, a network entity 600 resides at a 3rd party trust domain. The third party trust domain has a business relationship with PLMN. The network entity can be for example a server, a network node, a network element or the like which hosts one or more service APIs.

The network entity 600 includes an API provider 202 which includes an API exposing function 604, an API publishing function 606 and an API management function 608. The network entity 600 interacts with a CAPIF core function 510 in a PLMN trust domain.

The CAPIF core function 510 in the PLMN trust domain supports service APIs from both the PLMN trust domain and the 3rd party trust domain. The API invokers may exist within the PLMN trust domain, or within the 3rd party trust domain or outside of both the PLMN trust domain and the 3rd party trust domain as shown in the FIG. 5. The API provider 202 in 3rd party trust domain offers the service APIs from the PLMN operator. The API provider 102 in the PLMN domain offers the service APIs from the 3rd party. When the 3rd party API provider is a trusted 3rd party of the PLMN, the API provider 202 also offers the service APIs from the 3rd party.

The API invoker 2 within the PLMN trust domain interacts with the CAPIF core function 510 through CAPIF-1, and invokes the service APIs in the PLMN trust domain through CAPIF-2 and invokes the service APIs in the 3rd party trust domain via CAPIF-2e. The API invoker 3 within the 3rd party trust domain interacts with the CAPIF core function 510 through CAPIF-1e, and invokes the service APIs in the PLMN trust domain through CAPIF-2e and invokes the service APIs in 3rd party trust domain via CAPIF-2.

The API invoker 1 from outside the PLMN trust domain and 3rd party trust domain, interacts with the CAPIF core function 510 through CAPIF-1e and invokes the service APIs in the PLMN trust domain and the service APIs in the 3rd party trust domain through CAPIF-2e.

In an embodiment, the API exposing function 504, the API publishing function 506 and the API management function 508 of the API provider 102 within the PLMN trust domain interacts with the CAPIF core function 510 through CAPIF-3, CAPIF-4 and CAPIF-5 respectively.

The CAPIF-3 and CAPIF-4 interface allows the service APIs to interact with the CAPIF core function 510 through the API publishing function 606. The CAPIF-3 and CAPIF-4 interfaces support the following functions:

1. Publish Service API information to the API registry in order for the Service APIs to be discoverable by the applications,
2. Verify Application authentication at the time of Service API invocation,
3. Receive authorization from CAPIF core function 510 to access Service API,
4. Inform CAPIF core function 510 about API lifecycle management e.g. start or stop of a Service API.
5. Report CAPIF core function 510 about API events e.g. fault of a Service API or location change of the Application invoking Service API,
6. Report CAPIF core function 510 about API monitoring events e.g. load, resource usage,
7. Log Service API invocation events to CAFF e.g. invoker ID, IP address, service API name, version, input parameters, invocation result, time stamp,
8. To report CAPIF core function 510 the charging records generated from the Service API invocation, and
9. To enforce API provider configured policies on the Service APIs.

The interactions between API management function 608 and the CAPIF core function 510 is represented by CAPIF-5 interface.

The CAPIF-5 interface allows API provider to interact with CAPIF core function 510 for API management functions. The CAPIF-5 interface supports the following functions:

1. Enables the API provider to configure policies e.g. API invocation throttling, blocking API invocation for certain duration, whether API invocation is allowed while roaming. Policies can be defined to be enforced per API application or across applications,
2. Configure access control list of Service APIs per Application,
3. Access Service API invocation event logs and configure the log storage period,
4. For CAPIF core function 510 to request grant of new Application registration and confirm registration successful,
5. Allows API provider to update Application profile information stored in a database,
6. Allows API provider to govern the lifecycle status of Service APIs e.g. pilot or live, trace and access API versioning, control visibility of Service API (start or stop of Service API), and
7. Allows API provider to notify Service API events e.g. fault of a Service API or location change of the Application invoking Service API, load, resource usage, charging records.

In an embodiment, the API exposing function 604, the API publishing function 606 and the API management function 608 of the API provider 202 within the 3rd party trust domain interacts with the CAPIF core function 510 in the PLMN trust domain via CAPIF-3e, CAPIF-4e and CAPIF-5e respectively. The API exposing function 604 within the PLMN trust domain and the 3rd party trust domain provides the service APIs to the API invoker, offered by the respective trust domains.

In an embodiment, the API exposing function 604 communicates with the CAPIF core function 510 for performing at least one of access control of the service APIs, data logging, charging, authentication and authorization through the CAPIF-3e interface.

In an embodiment, the API publishing function 606 associated with the 3rd party domain publishes the one or more service APIs to the CAPIF core function 510 at the PLMN domain through the CAPIF-4e. The API publishing function 606 is a logical entity which supports the Service APIs to interact with CAPIF core function 510 and also in some cases to receive Service API related management commands from the API management function 608. This logical entity may also be called a framework control agent or framework control function, and may be collocated physically with the Service APIs or as a standalone entity.

In an embodiment, the API management function 608 communicates with the CAPIF core function 510 at the PLMN domain to perform at least one of access monitoring and checking policy configurations and provisioning of an API invoker client through the CAPIF-5e. Further, the API management function 608 allows the API provider 102 to read and write API management information into CAPIF core function 510 and also allows the API provider to provide management commands to Service APIs through the API publishing function 606.

In an embodiment, the communication between the API exposing function 504/604 and the CAPIF core function 510, between the API publishing function 506/606 and the CAPIF core function 510 and between the API management function 508/608 and the CAPIF core function 510 over CAPIF-3/3e, CAPIF-4/4e and CAPIF-5/5e respectively can be API based communication. The various functions supported by CAPIF-3, CAPIF-4 and CAPIF-5 interfaces are described in detail in conjunction with FIG. 9.

FIG. 6 illustrates various interactions when the CAPIF is hosted in PLMN domain supporting service capabilities in the PLMN domain, according to an embodiment as disclosed herein.

As depicted in the FIG. 6, the CAPIF core function 510 is hosted in the PLMN domain. When the CAPIF core function 510 is hosted in the PLMN domain, the API exposing function 504, the API publishing function 506 and the API management function 508 within the PLMN trust domain interacts with the CAPIF core function 510 through CAPIF-3, CAPIF-4 and CAPIF-5 respectively as shown in the FIG. 6.

In an embodiment, the API exposing function 504 hosts the PLMN service capabilities and PLMN hosted service capabilities as shown in the FIG. 6.

The API invoker 2 within the PLMN trust domain interacts with the CAPIF core function 510 through CAPIF-1 and and invokes the service APIs in the PLMN trust domain through CAPIF-2. The API invoker 1 from outside the PLMN trust domain interacts with the CAPIF core function 510 through CAPIF-1e and invokes the service APIs in the PLMN trust domain through the CAPIF-2e.

FIG. 7 illustrates various interactions when CAPIF is hosted in PLMN domain and API management function in third party domain, according to an embodiment as disclosed herein. In an embodiment as depicted in the FIG. 7, the CAPIF core function resides in the PLMN trust domain and an API management function 608 resides in the 3rd party trust domain. The API management function 608 within the 3rd party trust domain interacts with the CAPIF core function 510 in the PLMN trust domain through CAPIF-5e as shown in the FIG. 7.

FIG. 8 illustrates various interactions when CAPIF is hosted in both PLMN domain and the third party domain, according to an embodiment as disclosed herein. As depicted in the FIG. 8, the CAPIF is hosted in the 3rd party trust domain. In the FIG. 8, the PLMN domain includes the CAPIF core function 510 and the 3rd party trust domain includes the CAPIF core function 610.

In an embodiment, the API exposing function 504, the API publishing function 506 and the API management function 508 of the API provider 102 within the PLMN trust domain interacts with the CAPIF core function 510 through CAPIF-3, CAPIF-4 and CAPIF-5 respectively as shown in the FIG. 8.

In an embodiment, the API exposing function 604, the API publishing function 606 and the API management function 608 of the API provider 202 within the PLMN trust domain interacts with the CAPIF core function 610 through CAPIF-3, CAPIF-4 and CAPIF-5 respectively as shown in the FIG. 8.

FIG. 9 illustrates a common API framework (CAPIF) architecture hosted in PLMN domain when there is no 3rd party domain, according to an embodiment as disclosed herein. As depicted in the FIG. 9, the CAPIF architecture is hosted in the PLMN domain (i.e., network operator domain). As shown in the FIG. 9, the PLMN domain includes a network entity 500. The network entity can be a server, a network node, a network element or the like. The network entity includes an API provider 102, an API exposing function 504, an API publishing function 506 and the API management function 508.

In an embodiment, the API exposing function 504, the API publishing function 506 and the API management function 508 of the API provider 102 within the PLMN trust domain interacts with the CAPIF core function 510 through CAPIF-3, CAPIF-4 and CAPIF-5 respectively.

In an embodiment, the API invoker 1 from outside the PLMN trust domain interacts with the CAPIF core function 510 through CAPIF-1e and invokes the service APIs in the PLMN trust domain through CAPIF-2e as shown in the FIG. 9.

In an embodiment, the API invoker 2 within the PLMN trust domain interacts with the CAPIF core function 510 through CAPIF-1, and invokes the service APIs in the PLMN trust domain through CAPIF-2 as shown in the FIG. 9.

In an embodiment, the API invoker 1 and API invoker 2 are authenticated for discovery of northbound APIs at the CAPIF core function 510 through CAPIF-1e and CAPIF-1 respectively.

The API exposing function 504 communicates with the CAPIF core function 510 for performing at least one of access control of the service APIs, data logging, charging, authentication and authorization through the CAPIF-3e interface. The API publishing function 506 associated with the PLMN trust domain publishes the one or more service APIs to the CAPIF core function 510 through the CAPIF-4. Further, the API publishing function 606 associated with the 3rd party domain publishes the one or more service APIs to the CAPIF core function 510 at the PLMN domain through the CAPIF-4e.

In an embodiment, the API management function 508 communicates with the CAPIF core function 510 at the PLMN domain to perform at least one of access monitoring and checking policy configurations and provisioning of an API invoker client through the CAPIF-5.

The interaction between the service APIs and the CAPIF core function 510 is represented by two reference points namely CAPIF-3+CAPIF-4 and CAPIF-5.

FIG. 10 illustrates an integration of CAPIF with a Long Term Evolution (LTE) System, according to an embodiment as disclosed herein. As depicted in the FIG. 10, the CAPIF can be integrated with Service Capability Exposure Function (SCEF) in the LTE system.

FIG. 11 illustrates an integration of CAPIF with a New Radio (NR) System, according to an embodiment as disclosed herein. As depicted in the FIG. 11, the CAPIF can be integrated with NEF in the NR system (i.e., 5G system).

FIG. 12 is a flow chart 1200 illustrating a method for providing network based north bound APIs in a wireless communication system, according to an embodiment as disclosed herein. The various steps of the flow chart are performed by network entity 500/600 residing at the PLMN domain or the 3rd party trust domain using API exposing function 504/604, the API publishing function 506/606 and the API management function 508/608.

At step 1202, the method includes receiving a request for invoking one or more service APIs from one or more API invoker clients. The network entity resides either at the first domain (i.e., the PLMN trust domain) or at the second domain (i.e., the 3rd party trust domain).

At step 1204, the method includes utilizing the CAPIF core function 510 residing at the first domain to provide the one or more service APIs. The first domain can be the PLMN trust domain. In an embodiment, the he CAPIF core function 510 resides at the second domain as shown in the FIG. 8.

At step 1206, the method includes providing the one or more service APIs to the one or more API invoker clients through the CAPIF core function 510/610.

The embodiments disclosed herein can be implemented through at least one software program running on at least one hardware device and performing network management functions to control the elements.

FIG. 13 illustrates a network entity in the wireless communication system according to various embodiments of the present disclosure. For example, the network entity may be a API provider. The term "-module", "-unit" or "-er" used hereinafter may refer to the unit for processing at least one function or operation and may be implemented in hardware, software, or a combination of hardware and software.

Referring to FIG. 13, the network entity may include a backhaul communication interface 1310, a storage unit 1320, and a controller 1330.

The backhaul communication interface 1310 provides an interface for performing communication with other nodes within the network. That is, the backhaul communication interface 1310 converts bitstreams transmitted to another node, for example, another access node, a BS, a higher node, or a core network, from the network entity into a physical signal and converts the physical signal received from the other node into the bitstreams.

The storage unit 1320 stores a basic program, an application, and data such as setting information for the operation of the network entity. The storage unit 1320 may include a volatile memory, a non-volatile memory, or a combination of volatile memory and non-volatile memory. Further, the storage unit 1320 provides stored data in response to a request from the controller 1330.

The controller 1330 controls the general operation of the network entity. For example, the controller 1330 transmits and receives a signal through the backhaul communication interface 1310. Further, the controller 1330 records data in the storage unit 1320 and reads the recorded data. The controller 1330 may performs functions of a protocol stack that is required from a communication standard. To this end, the controller 1330 may include at least one processor.

According to exemplary embodiments of the present disclosure, the controller 1330 may receive a request for invoking one or more service APIs from one or more API invoker clients and utilize a CAPIF core function residing at a first domain to provide the one or more service APIs and provide the one or more service APIs to the one or more API invoker clients through the CAPIF core function, wherein the API provider comprises one or more service APIs, an API exposing function, an API publishing function and an API management function.

For example, the controller 1330 may control the network entity to perform operations according to the exemplary embodiments of the present disclosure.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by an application programming interface (API) provider in a wireless communication system, the method comprising:
receiving a request for invoking one or more service APIs from one or more API invoker clients;
communicating with a common API framework (CAPIF) core function for performing access control of the one or more service APIs based on the request; and
providing the one or more service APIs to the one or more API invoker clients,
wherein the API provider comprises an API exposing function, an API publishing function and an API management function.

2. The method of claim 1, wherein the one or more service APIs are discoverable at the CAPIF core function through one of a CAPIF-1 interface and a CAPIF-1e interface to the one or more API invoker clients.

3. The method of claim 1, wherein the request for the invoking of the one or more service APIs is received through one of a common API framework 2 (CAPIF-2) interface and a CAPIF-2e interface.

4. The method of claim 1, wherein the API exposing function performs at least one of authentication or authorization of the one or more API invoker clients using the request received through a CAPIF-2 interface and a CAPIF-2e interface from the one or more API invoker clients.

5. The method of claim 1, wherein the API exposing function associated with a third party domain communicates with the CAPIF core function for performing at least one of data logging, charging, authentication or authorization through a CAPIF-3e interface.

6. The method of claim 1, wherein the API publishing function associated with a third party domain publishes the one or more service APIs to the CAPIF core function through a CAPIF-4e message.

7. The method of claim 1, wherein the API management function associated with a third party domain communicates with the CAPIF core function to perform at least one of access monitoring, checking policy configurations or provisioning of an API invoker client through a CAPIF-5e interface.

8. The method of claim 1, wherein the API exposing function associated with a public land mobile network (PLMN) domain communicates with the CAPIF core function for performing at least one of data logging, charging, authentication or authorization through a CAPIF-3 interface.

9. The method of claim 1, wherein the API publishing function associated with a PLMN domain publishes the one or more service APIs to the CAPIF core function through a CAPIF-4 message.

10. The method of claim 1, wherein the API management function associated with a PLMN domain communicates with the CAPIF core function to perform at least one of access monitoring, checking policy configurations or provisioning of an API invoker client through a CAPIF-5 interface.

11. An apparatus for an application programming interface (API) provider in a wireless communication system, the apparatus comprising:
a transceiver; and
at least one processor;
wherein the at least one processor is configured to:
receive a request for invoking one or more service APIs from one or more API invoker clients;
communicate with a common API framework (CAPIF) core function for performing access control of the one or more service APIs based on the request; and
provide the one or more service APIs to the one or more API invoker clients,
wherein the API provider comprises an API exposing function, an API publishing function and an API management function.

12. The method of claim 11, wherein the one or more service APIs are discoverable at the CAPIF core function through one of a CAPIF-1 interface and a CAPIF-1e interface to the one or more API invoker clients.

13. The apparatus of claim 11, wherein the request for the invoking of the one or more service APIs is received through one of a common API framework 2 (CAPIF-2) interface and a CAPIF-2e interface.

14. The apparatus of claim 11, wherein the API exposing function performs at least one of authentication or authorization of the one or more API invoker clients using the request received through a CAPIF-2 interface and a CAPIF-2e interface from the one or more API invoker clients.

15. The apparatus of claim 11, wherein the API exposing function associated with a third party domain communicates with the CAPIF core function for performing at least one of data logging, charging, authentication or authorization through a CAPIF-3e interface.

16. The apparatus of claim 11, wherein the API publishing function associated with the third party domain publishes the one or more service APIs to the CAPIF core function through a CAPIF-4e message.

17. The apparatus of claim 11, wherein the API management function associated with a third party domain communicates with the CAPIF core function to perform at least one of access monitoring, checking policy configurations or provisioning of an API invoker client through a CAPIF-5e interface.

18. The apparatus of claim 11, wherein the API exposing function associated with a public land mobile network (PLMN) domain communicates with the CAPIF core function for performing at least one of data logging, charging, authentication or authorization through a CAPIF-3 interface.

19. The method of claim 1, wherein the API publishing function associated with a PLMN domain publishes the one or more service APIs to the CAPIF core function through a CAPIF-4 message.

20. The method of claim 1, wherein the API management function associated with a PLMN domain communicates with the CAPIF core function to perform at least one of access monitoring, checking policy configurations or provisioning of an API invoker client through a CAPIF-5 interface.

* * * * *